US008063764B1

(12) United States Patent
Mihailidis et al.

(10) Patent No.: US 8,063,764 B1
(45) Date of Patent: Nov. 22, 2011

(54) AUTOMATED EMERGENCY DETECTION AND RESPONSE

(75) Inventors: Alex Mihailidis, Toronto (CA); David Giesbrecht, Toronto (CA); Jesse Hoey, Newport-on-Tay (GB); Tracy Lee, Burnaby (CA); Vicky Young, Toronto (CA); Melinda Hamill, Milton (CA); Jennifer Boger, Toronto (CA); John Paul Lobos, Montreal (CA); Babak Taati, Toronto (CA)

(73) Assignee: Toronto Rehabilitation Institute, Toronto (CA)

(*) Notice: Subject to any disclaimer, the term of this patent is extended or adjusted under 35 U.S.C. 154(b) by 358 days.

(21) Appl. No.: 12/471,213

(22) Filed: May 22, 2009

Related U.S. Application Data

(60) Provisional application No. 61/071,939, filed on May 27, 2008.

(51) Int. Cl.
 *G08B 23/00* (2006.01)
 *G08B 1/08* (2006.01)
 *G08B 29/00* (2006.01)

(52) U.S. Cl. ... 340/517; 340/506; 340/531; 340/539.11; 340/539.12; 340/539.13; 340/539.17; 340/539.18; 340/539.22; 340/539.26; 340/540

(58) Field of Classification Search ............... 340/517, 340/506, 531, 539.11, 539.12, 539.17, 539.18, 340/540
See application file for complete search history.

(56) References Cited

U.S. PATENT DOCUMENTS

| | | | |
|---|---|---|---|
| 5,128,979 | A | 7/1992 | Reich et al. |
| 6,611,206 | B2 | 8/2003 | Milanski et al. |
| 7,095,328 | B1 | 8/2006 | Stern et al. |
| 7,110,569 | B2 | 9/2006 | Brodsky et al. |
| 7,231,200 | B2 | 6/2007 | Jenkins |
| 2002/0178022 | A1* | 11/2002 | Anderson et al. ............... 705/1 |

OTHER PUBLICATIONS

Hamill et al. "Development of an Automated Speech Recognition Interface for Personal Emergency Response Systems," *Jrnl. NeuroEngineering & Rehab.*, 6:26 (2009).
Lee et al., "An intelligent emerency response system," *Journal of Telemedicine and Telecare*, 11: 194-198 (2005).

(Continued)

*Primary Examiner* — Donnie Crosland
(74) *Attorney, Agent, or Firm* — Barnes & Thornburg LLP

(57) ABSTRACT

A system for detecting and responding to emergency events includes a plurality of local emergency detection and response units positioned in a local area. Each unit includes one or more local sensing agents and a local detection manager. Each local sensing agent is operable to detect emergency events by a change in a given emergency factor in the local area and to convey data representative of the change in the emergency factor to a detection manager which is operable to receive the data and to assign a value to the emergency factor according to the data. A central location controller unit and/or the local emergency detection and response unit are operable for classifying the assigned value of the emergency function to form an assigned value classification and for initiating the local emergency event response agent to implement a response protocol according to the assigned value classification.

21 Claims, 6 Drawing Sheets

OTHER PUBLICATIONS

Mihailidis et al., "An intelligent health monitoring and emergency response system," *International Conference on Smart Homes and Health Telematics*, Sherbrooke, Canada (2005).

Mihailidis et al. "The Role of Technology in Enhancing Safety in the Home: Detection of Falls and Emergency Situations," *Geriatrics and Aging Magazine*, 7(4): 90,89 (2004).

Silva et al., "Automatic Activity Detection for In-Place Care," *Institute of Biomaterials and Biomedical Engineering*, University of Toronto. Canada (2007).

Tam et al., "An intelligent emergency response system: Preliminary development and testing of a funtional health monitoring system," www.gerontechjournal.net (2006).

Schulze et al., "Concept and Design of a Video Monitoring System for Activity Recognition and Fall Detection," Ambient Assistive Health and Wellness Management in the Heart of the City, *Lecture Notes in Computer Science*, vol. 5597: 182-189 (2009).

* cited by examiner

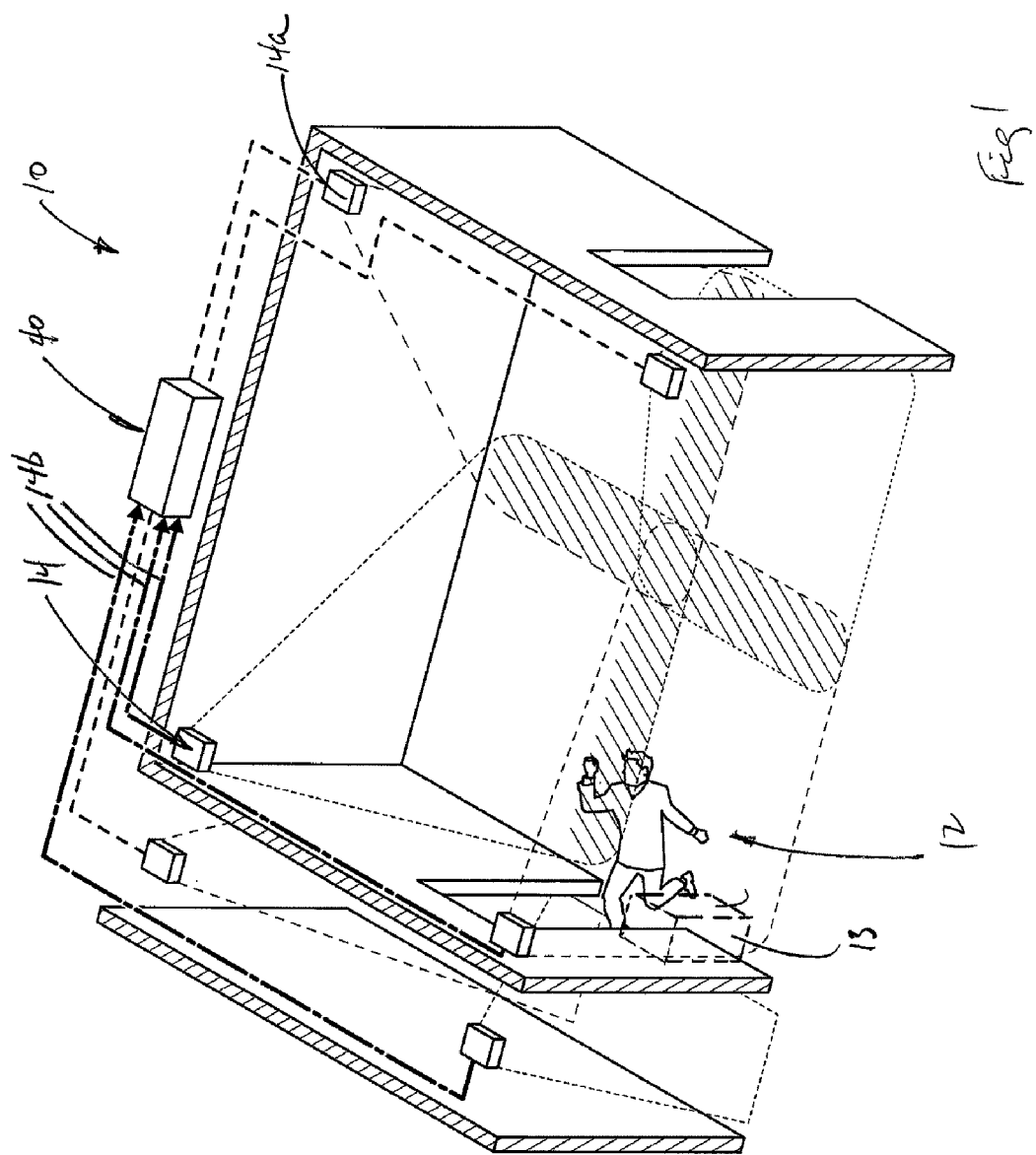

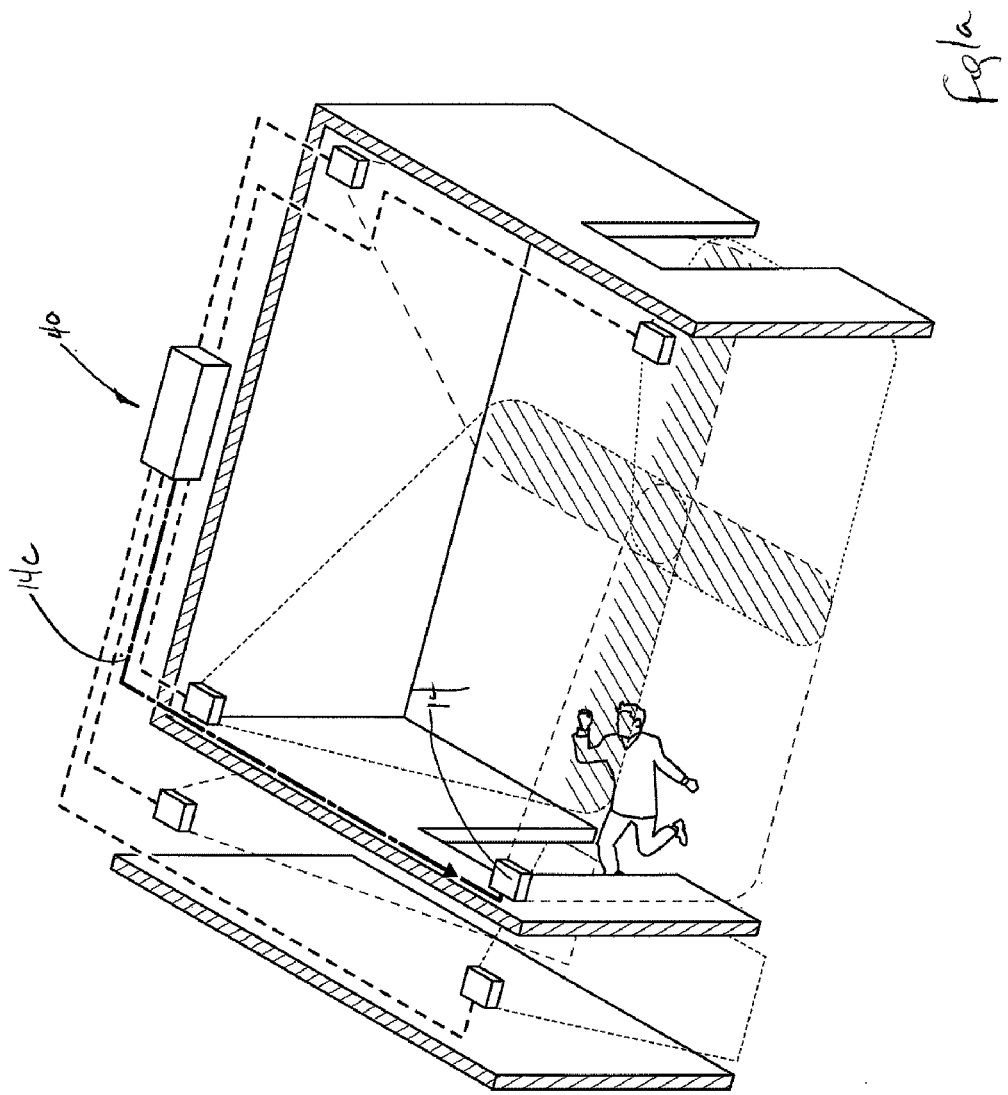

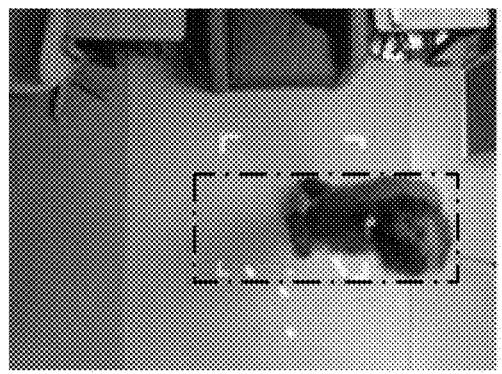
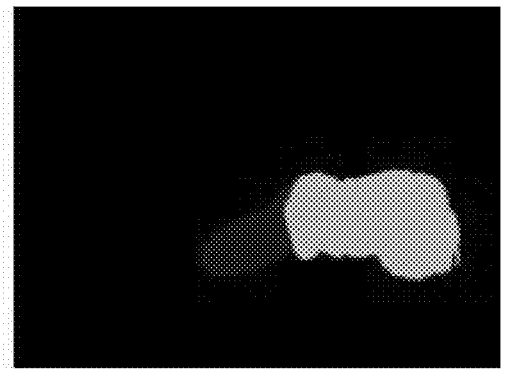
FIG. 5a · FIG. 5b
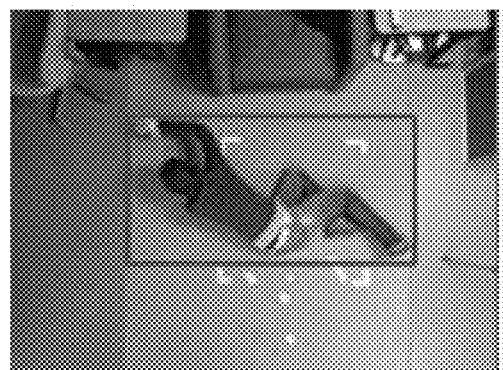
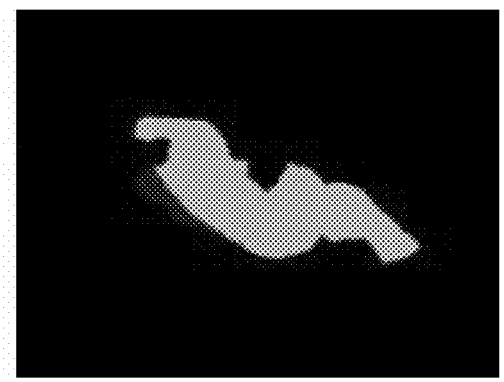
FIG. 6a · FIG. 6b

AUTOMATED EMERGENCY DETECTION AND RESPONSE

CROSS REFERENCE TO RELATED APPLICATIONS

The applicant claims benefit under 35 U.S.C. §119 of U.S. Provisional application No. 61/071,939, filed May 27, 2008, the entire subject matter of which application is incorporated herein by reference in its entirety.

FIELD OF THE INVENTION

The present invention relates to emergency detection systems and methods therefor.

DESCRIPTION OF THE RELATED ART

Falls in the home are the most common cause of injury among older adults or those with disabilities, and are a significant challenge to older adults maintaining their mobility. To address this issue several personal emergency response (PERS) products have been developed that allow an older adult to call for help using a wearable panic button. However, these devices often are ineffective because users forget to wear the button, user training is required, and the system cannot be operated if the person is severely injured or left unconscious. These limitations are further exacerbated if the older adult has a cognitive impairment, such as Alzheimer's disease.

It would be desirable to provide a novel approach to this task.

SUMMARY

In an exemplary embodiment, there is provided a system for detecting and responding to emergency events occurring in a predetermined local area, comprising a plurality of local emergency detection and response units positioned in the local area. Each local emergency detection and response unit includes one or more local sensing agents and a local detection manager. The local detection manager includes a local processor and each local sensing agent is operable to detect a change in a given emergency factor in the local area and to convey data representative of the change in the emergency factor. The detection manager is operable to receive the data and to assign a value to the emergency factor according to the data. A local interface agent is provided for issuing, on a data path, one or more event status signals including the assigned value for the emergency factor. A central location controller unit is also provided and includes a central processor and a central interface agent in communication with the local interface agent on the data path to receive the event status messages therefrom. Each local emergency detection and response unit includes a local emergency event response agent for responding to at least one person in or near the local area. The central location controller unit and/or the local emergency detection and response unit are operable for classifying the assigned value of the emergency function to form an assigned value classification and initiating the local emergency event response agent to implement a response protocol according to the assigned value classification, and which includes dispatching a message to the person and recording a response therefrom The central processor includes a ranking agent for ranking status signals being received from more than one local emergency detection and response unit in the same local area.

In some exemplary embodiments, the ranking agent is operable to rank each of the emergency detection and response units according to one or more ranking criteria. The central processor is also operable to select one of the emergency detection and response units according to the ranking as an active local emergency detection and response unit to initiate the emergency event response protocol.

In some exemplary embodiments, the central processor is operable to receive status signals over regular, or periodic time intervals and to change the selection of the active emergency detection and response unit according to changes in the status signals.

In some exemplary embodiments, the at least one emergency factor is selected from a plurality of video variables and/or thresholds, a plurality of audio variables and/or thresholds, and a plurality of environmental variables and/or thresholds.

In some exemplary embodiments, the environmental variables and/or thresholds, include smoke concentration, carbon monoxide concentration, oxygen concentration, and/or environmental pollutant concentration.

In some exemplary embodiments, the ranking agent is operable to access and compare a plurality of emergency factors received from the plurality of reporting local emergency detection and response units.

In exemplary some embodiments, the emergency factor includes a video image, the variable including size, shape, and motion of object being tracked.

In some exemplary embodiments, the emergency factor includes an audio signal, the variable including amplitude and type of the audio signal.

In some exemplary embodiments, the ranking agent assigns, as active, the active local emergency detection and response unit possessing the highest ranking for a given emergency factor.

In some exemplary embodiments, the local processor or the central processor includes a voice processing agent for issuing voice signals to the person or receiving and interpreting voice signals from the person.

In some exemplary embodiments, one of the sensing functions includes a fixed or steerable digital camera.

In some exemplary embodiments, one of the sensing functions includes a microphone.

In some exemplary embodiments, one of the sensing functions includes an environmental detector.

In another exemplary embodiment, there is provided a system for detecting and responding to emergency events occurring in a predetermined local area. The system comprises a plurality of local emergency detection and response units positioned in the local area. Each local emergency detection and response unit includes one or more local sensing agents and a local detection manager. The local detection manager includes a local processor. Each local sensing agent is operable to detect emergency events by a change in a given emergency factor in the local area and to convey data representative of the change in the emergency factor. The detection manager is operable to receive the data and to assign a value to the emergency factor according to the data. A local interface agent is provided for issuing, on a data path, one or more event status messages including the assigned value for the emergency factor. A central location controller unit is also provided which includes a central processor and a central interface agent in communication with the local interface agent on the data path to receive the event status messages therefrom. Each local emergency detection and response unit includes a local emergency event response agent for responding to at least one person in or near the predetermined area.

The central location controller unit and/or the local emergency detection and response unit are operable for classifying the assigned value of the emergency function to form an assigned value classification and for initiating the local emergency event response agent to implement a response protocol according to the assigned value classification.

In some exemplary embodiments, the central processor is operable to receive regular or periodic messages from each emergency detection and response unit after detecting activity in the local area. The central processor may then record the activity to track a subject between multiple emergency detection and response units as the subject moves through the local area.

In another exemplary embodiment, there is provided a system for detecting and responding to emergency events occurring in a predetermined local area. The system comprises a plurality of local emergency detection and response units to be positioned in the local area. Each local emergency detection and response unit includes one or more local sensing agents and a local detection manager. The local detection manager includes a local processor. Each local sensing agent is operable to detect a change in a given emergency factor in the local area and to convey data representative of the change in the emergency factor. The detection manager is operable to receive the data and to assign a value to the emergency factor according to the data. A local interface agent is also provided for issuing, on a data path, one or more event status signals includes the assigned value for the emergency factor. Each local emergency detection and response unit includes a local emergency event response agent for responding to at least one person in or near the local area, the local emergency detection and response unit being operable for classifying the assigned value of the emergency function to form an assigned value classification and initiating the local emergency event response agent to implement a response protocol according to the assigned value classification. The response protocol includes dispatching a message to the person and recording a response therefrom. One or more of the local detection and response units are responsive to data received on the data path for ranking status signals received from more than one local emergency detection and response unit in the same local area. One or more of the local emergency detection and response units are operable to select one of the emergency detection and response units according to the ranking as an active local emergency detection and response unit to initiate the emergency event response protocol.

In some exemplary embodiments, the local emergency detection and response units are each operable for exchanging the assigned values from one another to form an assigned value group.

In some exemplary embodiments, one or more of the local emergency detection and response units are operable to select an active emergency detection and response unit according to a ranking of individual values in the value group.

In some exemplary embodiments, the central location controller unit and/or the local emergency detection and response unit is operable for classifying the assigned value of the emergency function to form an assigned value classification and initiating the local emergency event response agent to implement a response protocol according to the assigned value classification.

In still another exemplary embodiment, there is provided a method for detecting and responding to emergency events occurring in a predetermined local area. The method comprises providing a plurality of local emergency detection and response units positioned in the local area, providing each local emergency detection and response unit with one or more local sensing agents and a local detection manager with a local processor, arranging the local sensing agents to detect a change in a given emergency factor in the local area and to convey first data representative of the change in the emergency factor, arranging the detection manager to assign a value to the emergency factor according to the first data, providing a local interface agent for issuing, on a data path, one or more event status signals including the assigned value for the emergency factor, providing a central location controller unit including a central processor and a central interface agent in communication with the local interface agent on the data path to receive the event status messages therefrom, providing in each local emergency detection and response unit a local emergency event response agent for responding to at least one person in or near the predetermined area, arranging the central location controller unit and/or the local emergency detection and response unit for classifying the assigned value of the emergency function to form an assigned value classification and initiating the local emergency event response agent to implement a response protocol according to the assigned value classification, providing the central processor with a ranking agent for ranking status signals being received from more than one local emergency detection and response unit in the same predetermined local area.

In still another exemplary embodiment, there is provided a method for detecting and responding to emergency events occurring in a predetermined local area. The method comprises providing a plurality of local emergency detection and response sites in the local area, providing each local emergency detection and response site with one or more local sensing agents, sensing at each of the sites a change in a given emergency factor in the local area, providing a detection manager to receive from each site a first data representative of the change in the emergency factor, arranging the detection manager to assign a value to the emergency factor according to the first data, dispatching one or more event status signals including the assigned value for the emergency factor, providing a central location controller to receive the event status messages therefrom, arranging the emergency detection and response site and/or the central location controller to classify the assigned value of the emergency function to form an assigned value classification, arranging the central location controller to rank status signals received from more than one local emergency detection and response site in the same predetermined local area, according to one or more ranking criteria and to select one of the emergency detection and response sites according to the ranking as an active local emergency detection and response site to initiate an emergency event response protocol.

In yet another exemplary embodiment, there is provided a method for detecting and responding to emergency events occurring in a predetermined local area. The method comprises:

i. providing a local emergency detection and response unit in the local area, ii. providing the local emergency detection and response unit with one or more local sensing agents and a local detection manager with a local processor, iii. configuring the local sensing agents to detect an emergency event by a change in a corresponding emergency factor in the local area, and to generate data representative of the change in the emergency factor, arranging the detection manager to assign a value to the emergency factor according to the first data, iv. providing a local interface agent for issuing, on a data path, one or more event status signals including the assigned value for the emergency factor, v. providing a local emergency event response agent for responding to at least one person in or near the local area, and vi. configuring the local interface agent to receive an initiation signal for initiating the local emergency event response agent to implement a response protocol according to an assigned value.

In yet another exemplary embodiment, there is provided a method for detecting and responding to emergency events occurring in a predetermined local area. The method comprises:

i. providing a plurality of local emergency detection and response sites in the local area;

ii. providing each local emergency detection and response site with one or more local sensing agents;

iii. configuring the sensing agents to sense a change in a predetermined emergency factor in the local area;

iv. providing a detection manager at each site to receive, from each sensing local sensing agent, data representative of the change in the emergency factor, v. arranging the detection manager to assign a value to the emergency factor according to the data;

vi. dispatching, over a data path, one or more event status messages including the assigned value for the emergency factor;

vii. providing a central location controller to receive, in a first operative phase, the event status messages over the data path; and viii. configuring the central location controller, in a second operative phase, to:

1. classify the assigned value of the emergency factor to form an assigned value classification;

2. rank the status messages according to one or more ranking criteria, 3. select one of the emergency detection and response sites according to the ranking as an active local emergency detection and response site to initiate an emergency event response protocol; and 4. instruct the selected active local emergency detection and response site to initiate the emergency event response protocol.

Some exemplary embodiments further comprise configuring the central location controller to:

i. operate in the first operative phase receive the event status messages;

ii. operate in the second operative phase concurrently with the first operative phase to:

1. select a new active local emergency detection and response site according to changes in the assigned values of the emergency factors; and 2. instruct the new active local emergency detection and response site to initiate the emergency event response protocol

BRIEF DESCRIPTION OF THE DRAWINGS

Several exemplary embodiments of the present invention will be provided, by way of examples only, with reference to the appended drawings, wherein:

FIGS. 1 and 1a are operational perspective views of a system for detecting and responding to emergency events;

FIGS. 5a, 5b, 6a and 6b show tracking results for an exemplified mode of operation for the system of FIG. 1.

DETAILED DESCRIPTION

Figure 2:
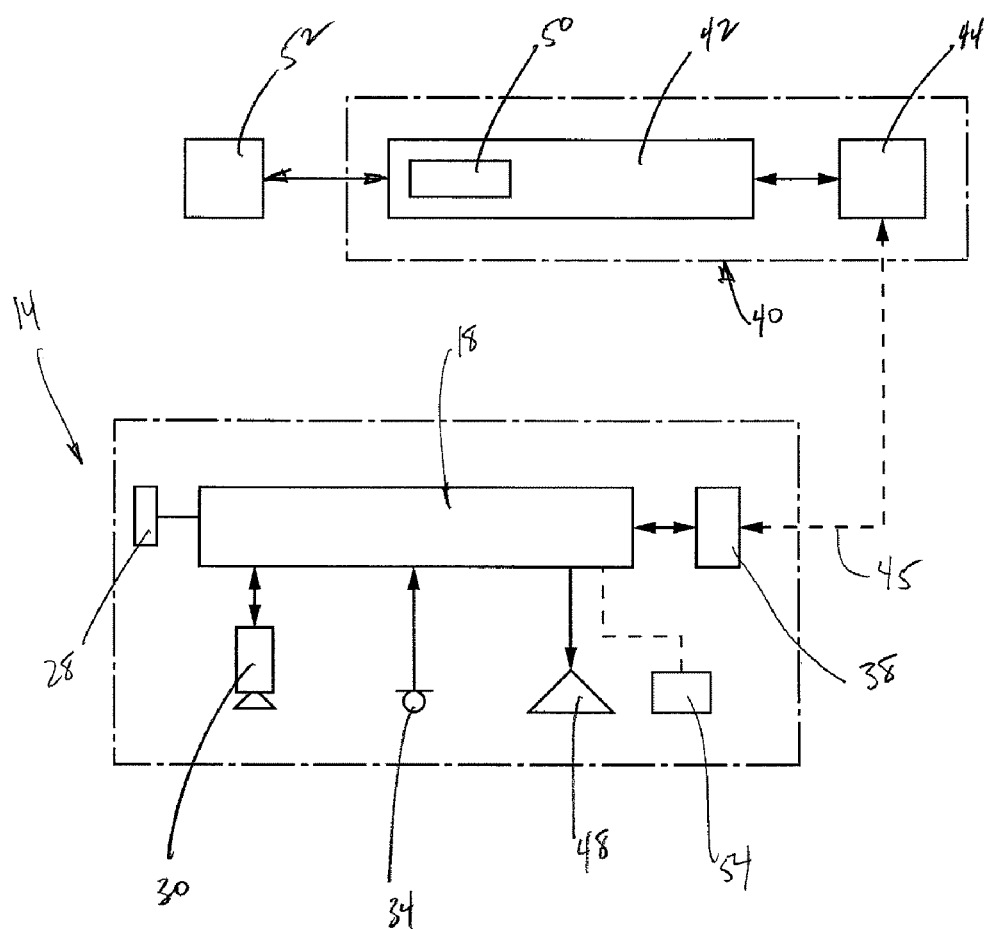
FIGS. 2 and 3 are schematic views of portions of the system of FIG. 1.

It should be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Furthermore, and as described in subsequent paragraphs, the specific mechanical, electrical or other configurations illustrated in the drawings are intended to exemplify embodiments of the invention. However, other alternative mechanical, electrical or other configurations are possible which are considered to be within the teachings of the instant disclosure. Furthermore, unless otherwise indicated, the term "or" is to be considered inclusive. The term "agent" is intended to include a portion of or any combination of hardware, firmware or software to carryout a prescribed function.

Referring to the figures, there is provided a system 10 for detecting and responding to emergency events occurring in a predetermined local area 12. The system includes a plurality of local emergency detection and response units (or hereinafter referred to as EDR units) 14 positioned in the local area 12.

Each EDR unit 14 includes one or more local sensing agents 16 and a local detection manager 18. The local detection manager includes a local processor 20 with a control module 22 which communicates with the local sensing agents 16, including a local video sensing agent 24, a local audio sensing agent 26 and, in this example, an environmental sensing agent 28. Each local sensing agent is operable to detect a change in a given emergency factor in the local area and to report to the control module accordingly. Each local sensing agent conveys data representative of the change in the emergency factor to the control module 22.

In this case, the local video sensing agent 24 includes a video camera 30 monitored by a video processing module 32. As will be described, the video processing module 32 is thus operable to detect a change in a given emergency factor in the local area 12, in this case, for example, by detecting the presence of a person, subject, user or other object in the local area 12. In this case, the person may include, amoung others, a patient in a healthcare facility, or a resident of a residential or other facility, with or without disabilities, or others who may be prone to falling or to disorientation or suffer from other condition worthy of monitoring and response, in the manner to be described. Also in this case, the audio sensing agent 26 includes a microphone 34 monitored by a speech dialog module 36. As will be described, the speech dialog module 36 is thus operable to detect a change in a given emergency factor in the local area 12, in this case, for example, by detecting a verbal message from a person in the local area, which may be in response to automated questions being asked by the EDR units 14 to determine the severity of the emergency, as will be described. In both cases, the video processing module 32 and the speech dialog module 36 convey data to the control module 22 for further processing. In this case, the control module 22, the video processing module 32, and the speech dialog module 36 may be applications running on the local processor 20 or be one or more distinct processors, such as by way of video cards and the like.

The control module 22 is, in turn, operable to assign a value to the emergency factor according to the data received from one or more of the video processing module, the speech dialog module and the environmental monitor 28, as the case may be.

A local interface agent 38 is provided for issuing, on a data path, one or more event status signals including the assigned value for the emergency factor.

A central location controller unit 40 is provided in the form of a central server, with one or more central processors 42 communicating with a central interface agent 44 to receive event status messages therefrom on a communication channel shown at 45. In this case, the central and local interface agents may include wired or wireless network cards, RFID tags, Bluetooth, or other forms of transmitter receivers as the case may be.

The system 10 is operable in a communication network which, in this example, is computer implemented and may be provided in a number of forms, by way of one or more software programs configured to run on one or more general purpose computers, such as a personal computer, or on a single custom built computer, such as a programmable logic controller (PLC) which is dedicated to the function of the system alone. A system controlling such a communication network may, alternatively, be executed on a more substantial computer mainframe. The general purpose computer may work within a network involving several general purpose computers, for example those sold under the trade names APPLE or IBM, or clones thereof, which are programmed with operating systems known by the trade names WINDOWS, LINUX or other well known or lesser known equivalents of these. The system may involve pre-programmed software using a number of possible languages or a custom designed version of a programming software. The computer network may be include a wired local area network, or a wide area network such as the Internet, or a combination of the two, with or without added security, authentication protocols, or under "peer-to-peer" or "client-server" or other networking architectures. The network may also be a wireless network or a combination of wired and wireless networks. The wireless network may operate under frequencies such as those referred to as 'radio frequency' or "RF" using protocols such as the 802.11, TCP/IP, BLUE TOOTH and the like, or other well known Internet, wireless, satellite or cell packet protocols. While the assembly 10 collects location data from the EDR units 14, each EDR alone or the central server 40 may have the ability to determine its location within the local area by use of other locating methods, such as by the use of network addresses, GPS positions or the like.

Each local EDR unit 14 further includes a local emergency event response agent 46 for responding to at least one person in or near the predetermined local area. In this case, the emergency event response agent is provided by the speech dialog module 36 and a loudspeaker 48.

In this case, each local EDR unit 14 includes a housing 14*a* containing the local processor 20, the control module 22, the video camera 30, the video processing module 32, the speech dialog module 36, the microphone 34 and the loudspeaker 48. However, other variations may see one or more of these components being located outside the housing 14*a*, as desired. If desired, the surface of the housing 14*a* may be paintable, allowing for custom colouring of the housing according to the décor of a monitored location. The housing may also be provided in varying shapes and styles creating different options for the product's appearance, as desired. To guard against the possibility of a power outage, each EDR unit may be provided with a backup battery.

As will be described below, the central location controller unit 40 and/or the EDR units 14 are operable for classifying the assigned value of the emergency function to form an assigned value classification and for initiating the local emergency event response agent 46 to implement a response protocol according to the assigned value classification.

The central processor 42 includes a ranking agent 50 for ranking status signals being received from more than one local EDR unit 14 in the same predetermined local area 12.

The ranking agent 50 is operable to rank each of the EDR units 14 according to one or more ranking criteria. The central processor is thus operable to select one of the EDR units 14 according to the ranking as an "active" EDR unit to initiate the emergency event response protocol. Alternatively, one or more of the EDR units themselves may be configured to selective an "active" EDR unit. In this case, the data paths 14*b* may be configured to form a local emergency and detection and response network, in which the local emergency detection and response units are each operable for exchanging the assigned values from one another to form an assigned value group. In this case, one or more of the local emergency detection and response units being operable to select an active emergency detection and response unit according to a ranking of individual values in the value group.

In this case, at least one emergency factor may include a plurality of video variables and/or thresholds, a plurality of audio variables and/or thresholds, and a plurality of environmental variables and/or thresholds. The environmental variables and/or thresholds may, in this case, include temperature, atmospheric pressure, humidity, smoke concentration, carbon monoxide concentration, oxygen concentration, and/or environmental pollutant concentration.

The ranking agent 50 may access and compare a plurality of emergency factors received from the plurality of reporting local emergency detection and response units 14. The emergency factor may include, in this case, a video image, the variable including size, shape, and motion of object being tracked. Alternatively, the emergency factor may include an audio signal, the variable including amplitude and type of the audio signal.

Figure 3:
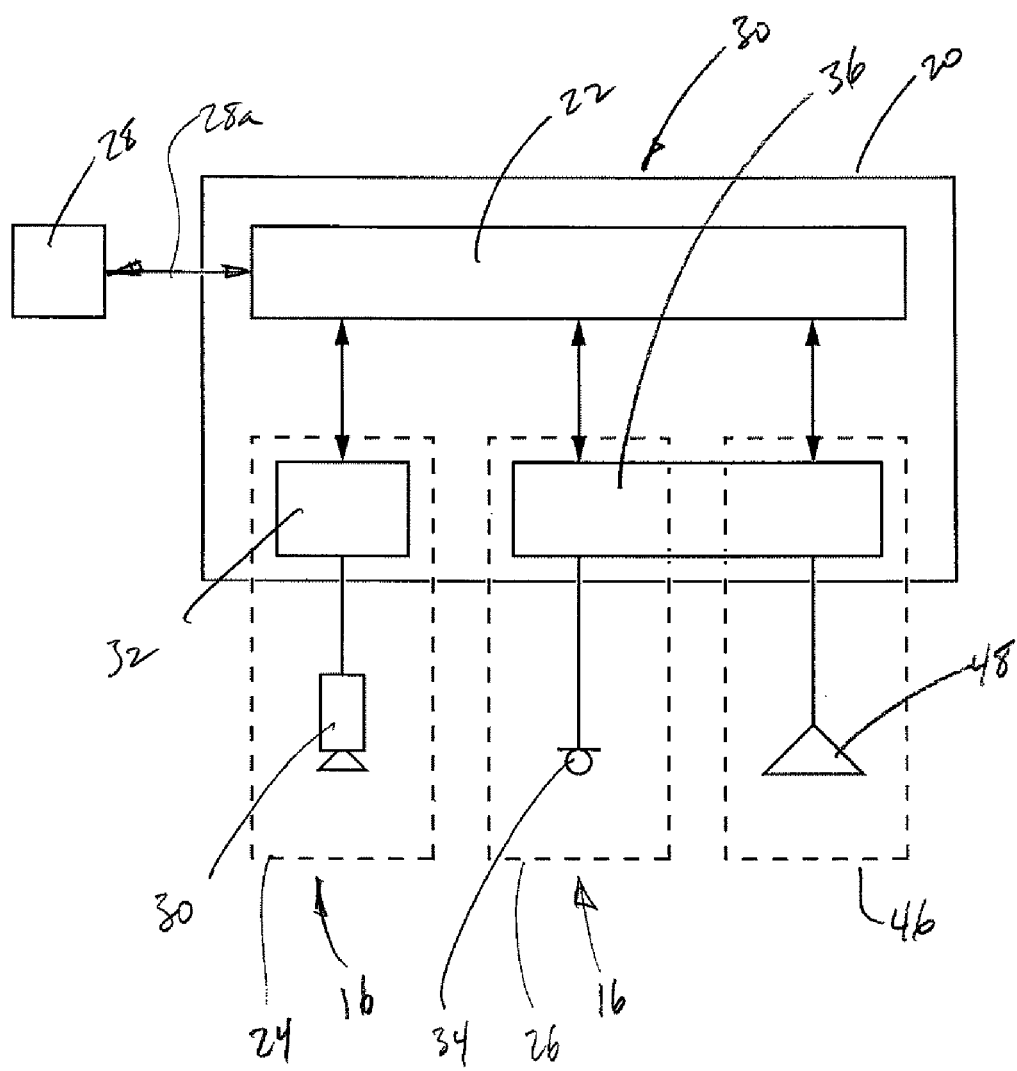
Figure 4:
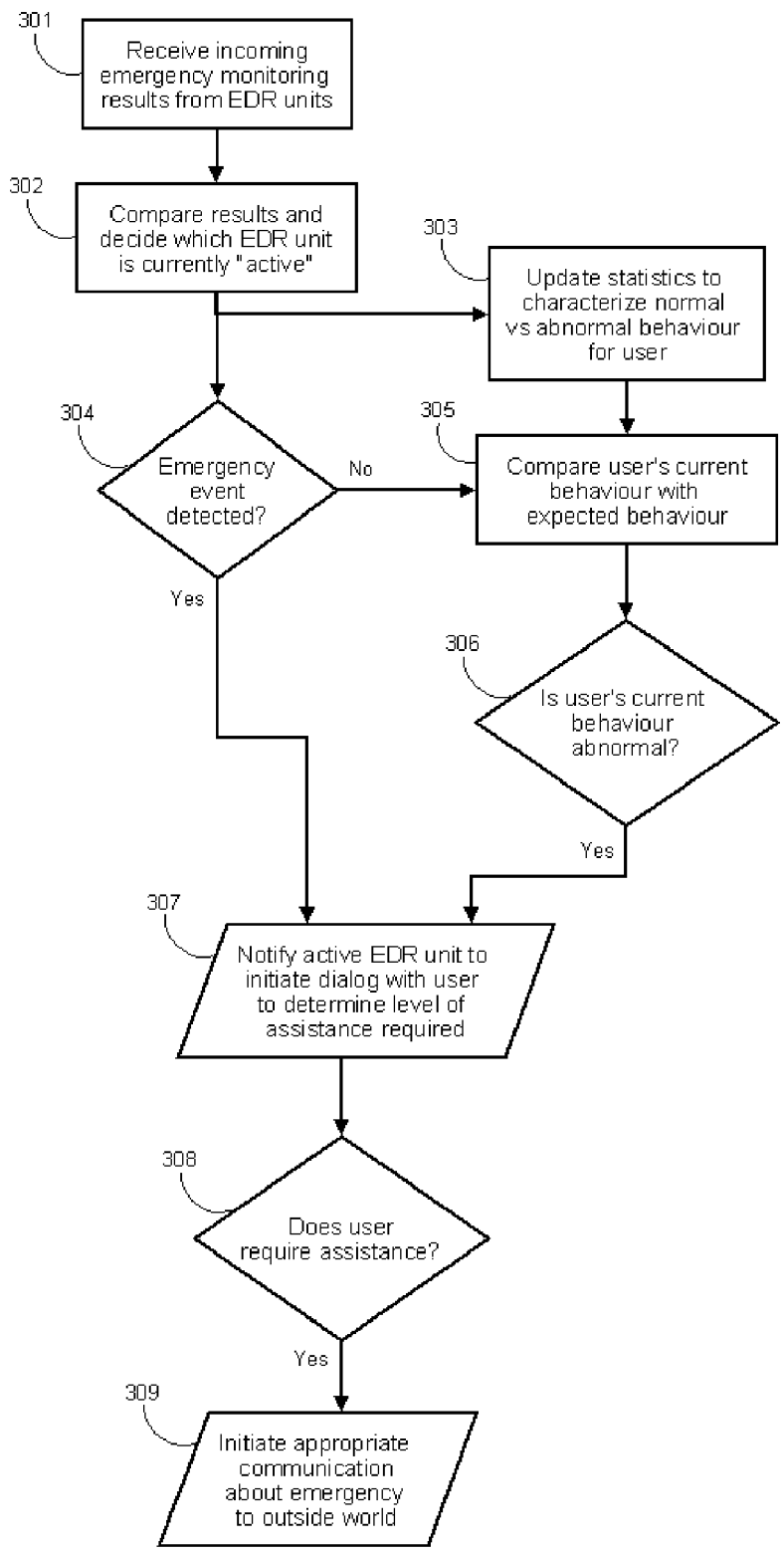
FIG. 4 is a flow diagram showing an operative mode of the system of FIG. 1.

Thus, FIGS. 1 to 3 shows a general schematic of the various parts of a single unit, while FIG. 4 is a flow diagram outlining a preferred decision-making process performed by the central server, to communicate with multiple EDR units simultaneously.

The system 10 is configured so that the EDR units 14 may be located throughout a person's living space. The central server 40 makes overall decisions about which EDR unit 14 is actively monitoring or communicating with the human user at a given point in time. In the event of an emergency, the central server 40 may also facilitate communications with the outside world (e.g. contact a neighbour, relative or 911), by way of an external interface unit 52, for example.

Each EDR unit 14 may thus include one or several hardware components which may be installed in a common housing, such as one or more cameras, such as a webcam or 'steerable' camera, one or more small loudspeakers, a single, multiple or small array of microphones, a computer processor, or an environmental monitor, such as a smoke and/or carbon monoxide detector.

Each EDR unit 14 may be portable or mobile, such as on a movable robot, or it may be stationary and installed in an appropriate location in a user's house or long-term care facility, such as on the ceiling of the living room or bedroom. In one example, the EDR unit, or a component thereof, may be mounted on the user. This might include a blood pressure or heart rate monitor, or the like.

The EDR unit 14 may use the camera(s) or microphone(s) to monitor the living environment of a human subject in real-time. The camera may be fixed within the housing, with a static field of view, or 'steerable' allowing it to follow the movement of a given subject. The local processor 20 in this case performs real-time analysis of the video and audio inputs to determine if an emergency event, such as a fall, has occurred. In the event of an emergency, the EDR unit 14 can communicate with the subject via the microphone 34 and loudspeaker 48 and initiate a dialog using speech recognition software. Communicating with the subject in this way, allows the system to determine the level of assistance required. If external assistance is required (e.g. from relatives, neighbours or emergency services), the local processor 20 can relay this information to the central server 40 located at a convenient location in the house or other facility. Information between the local processor 20 and the central server 40 can occur via either a standard wired or wireless (Wi-Fi) communication network. The server may send information about an emergency event to the outside world via a variety of possible communications methods (e.g. landline or cell phone network, text messaging, email), via the external interface 52.

It should be noted that, in one example, the system 10 may ensure that the privacy of the subject is maintained at all times by configuring the local processor 20 to relay only computer vision and speech recognition results, as well as information about a possible emergency event, to the central server, but not any of the original video or audio information. In another example, original video or audio information may be relayed to the central server for further processing.

In this example, the environmental sensing agent 28 or Environmental Monitor may include sub-components such as a smoke detector and a carbon monoxide detector. Thus, in the event of a smoke, fire or carbon monoxide emergency the Environmental Monitor may also relay this information to the appropriate emergency services via the central server 40.

The video processing module 32 takes real-time video input from the video camera 30, and performs computer vision algorithms to determine if an emergency has occurred. The employed computer vision algorithms may include object extraction and tracking techniques such as adaptive background subtraction, color analysis, image gradient estimation, and connected component analysis. These techniques allow the system to isolate a human subject from various static and dynamic unwanted features of the video scene, including the static background, dynamic cast shadows and varying light conditions. As such, characteristics of the subject's movement, posture and behaviour may be monitored in real-time to determine if an emergency (e.g. a fall) has occurred. The video processing module 32 may relay information of this emergency event to the control module 22. For instance, FIGS. 5a and 5b illustrate tracking results for a subject walking, with an original "webcam" image and the extracted silhouette of the subject (light blue, or white as shown in the black and white version presented herein) and their shadow (dark blue or grey in the black and white version presented herein). As the subject is not in need of assistance, the tracking box on the shows "green" (in this case in chain dotted lines). When a fall is detected, as shown in FIGS. 6a and 6b, the tracking box may then change state, such as to the colour "red" (as shown by the solid lines) and the silhouette is elongated with very little shadow. In the event of an emergency, the control module 22 may instruct the speech dialog module 36 to initiate a conversation with the subject using speech recognition software, such as a small vocabulary, speaker-independent automatic speech recognition (ASR) software. However, other configurations of ASR software, such as speaker-dependent or adaptable ASR, may also be used. This ASR software may be specially trained on population-specific and/or situation-specific voice data (e.g. older adult voices, voices under distress) to maximize speech recognition results. Other audio processing techniques, such as real-time background noise suppression, and the recognition of environmental sounds (e.g. falling objects, slam sounds, etc.) may also be employed to ensure robust system performance.

The speech dialog module 36 may communicate directly with the subject by outputting speech prompts via the loudspeaker(s) 48 and listening to audio input via the microphone(s) 34, to determine the level of assistance that the subject may require. The outcome of this speech dialog can be sent to the control module 22 and, if further assistance is required, the control module 22 can relay this to the central server 40 via the communications network 45.

An alternative example implementation of the system 10 may allow for emergency situations to be detected by either the video processing module 32 or the speech dialog module 36 simultaneously. In this configuration, the microphone 34 may be on at all times, allowing the speech dialog module 36 to listen for key emergency words or audio events (e.g. a cry for "help!", a loud crash). This implementation may be particularly useful if the video processing module 32 is unable to detect a given emergency situation (e.g. if the subject is outside the field of view of the camera(s), or during low light conditions such as nighttime).

As an optional feature, the EDR unit 14 may also include a motion sensor 54, such as an infrared sensor. The video camera 30 may also be equipped for "night vision". This may add additional functionality to the system, such as the ability for a given unit to automatically turn on when significant motion is detected (e.g. when a person enters a room), or for more robust vision tracking in low light conditions (e.g. at nighttime). This functionality may allow the system to also operate in an "away" mode, thereby to detect in-home disturbances or intrusions when the person is not home. Therefore, an additional application for the system may be to act as a home security system or to augment existing home security systems. A light bulb may also be fitted in each EDR unit, so as to be activated by a light switch, for example on a neighbouring wall. If desired, the light on the EDR unit may operate in the same fashion as a conventional ceiling-mounted light fixture, enabling a user to replace or augment existing ceiling mounted light fixtures with functions of the device 10.

The central server 40 is able to handle simultaneous communications with one or multiple EDR units 14, allowing for multiple EDR units 14 to be installed in different rooms of a house, assisted living facility or long-term care facility. Therefore, at a given point in time, the central server may analyze the information simultaneously received from multiple EDR units 14 and determine which EDR unit is currently "active" (i.e., which camera currently has the subject of interest within its field of view). This may be accomplished by comparing the audio and/or computer vision tracking and/or audio processing results from each local processor 20. For example, the EDR unit currently tagged as "active" may be the one currently tracking the object with the largest size or with significant movement. This methodology allows for the central server 40 to track a subject between the cameras of multiple EDR units installed in the same room, or throughout various rooms of a house, ensuring that an emergency event is detected robustly.

FIG. 4 is a flow diagram outlining this decision-making process performed by the central server 40, which may communicate with multiple EDR units 14 simultaneously. At step 301, the central server 40 receives emergency monitoring results from the EDR units 14, as shown in FIG. 1, with the three EDR units 14 on the left side of the space 12 reporting with the message on data paths 14*b*. This connection 45 may be a wireless network connection (Wi-Fi) or some other type of communications connection. The emergency monitoring information received by the central server 40 may include complete or partial results from the analysis of video input and/or audio input from each EDR unit 14. For example, video analysis results may include information such as: the present or absence of an object of interest (e.g. human user) in the camera's field of view, size and movement of the object, etc. Similarly, audio analysis results may include: the presence or absence of a significant audio event of interest (e.g. speech, loud crash noise), the detected loudness of the audio event, etc. Other important video/audio monitoring results may also be received at this step depending on the nature of the video/audio analysis performed by the EDR units.

At step 302, the monitoring results received from all EDR units 14 are compared, and the central server 40 decides which EDR unit 14 is currently in a fully "active" state. In order to do this, the central server 40, via ranking agent 50, ranks all the received emergency monitoring results according to a set of video and/or audio analysis criteria and thresholds. These analysis criteria and thresholds may be fixed or dynamic depending on a given video or audio scenario. Such ranking criteria may include video analysis metrics such as the current size of the object being tracked, if present, by each video camera 30, and audio analysis metrics such as the current amplitude of audio or speech, if present, captured by each microphone 34. For a given point in time, the EDR unit 14 with the highest rank may then be chosen to be the currently "active" EDR unit 14. Using these ranking criteria may ensure that the chosen active EDR unit will be the unit that is currently best suited for monitoring the human user and detecting and responding to possible emergency events. In this case, the system will continue to receive EDR data on a regular basis as the subject progresses through a particular monitoring time period, either in a single monitored location or in a plurality of monitored location. This may involve several ceiling mounted EDR units mounted throughout the location(s) and one central controller that supervises and coordinates the monitoring operations of the EDR units.

In the interests of minimizing power consumption and extending the life of the EDR units, the central controller may be configured to employ predictive modeling to determine a predicted location of an occupant. In this case, the central controller may activate (power-on) tracking units that are located in areas that are proximal to and currently containing the occupant(s). Areas that are not in use by the occupant(s) may be kept in a standby (power-save) mode. Predictive algorithms may be employed to determine the areas the occupant is most likely to move to, activating tracking units that are located in the areas along the occupant(s)' likely path of travel. During periods of inactivity, the central controller may be used to place all units on standby except those monitoring areas of critical interest. Examples of this include monitoring only a bedroom location, while the occupant is asleep or only the entrance area if the occupant has left his/her home.

Once the active EDR unit has been chosen, the central server 40 may notify all EDR units 14 of this decision, and/or notify only the currently active unit to continue with the full detection of and response to an emergency event, the latter case shown by path 14*c* in FIG. 1*a*. This decision-making framework by the server may prevent multiple EDR units from detecting the same emergency event and confusing the user by all starting a dialog with the user simultaneously. Thus, the EDR units are operable to sense data either continuously, regularly or periodically, thus dispatching signals to the central controller continuously, regularly or periodically and then being responsive to the central controller to be selected for implementing dialog with a subject. Therefore, the communication with the subject occurs following (and not before) selection of an active EDR, according to prevailing emergency factor data. That being said, the active status of a selected EDR at time T=T1 may not be effective at time T=T2, if the emergency factor data indicates a change, as may occur if the subject were to slip and fall in a bedroom (at T=T1) and then stand up and stumble into a neighbouring hallway. In this case, a successive train of EDR's may be activated and then deactivated, in succession, as the subject moves.

The active EDR unit 14 is then operable to monitor the user and detect if an emergency occurs (e.g. a fall). If such an event does occur, this information may be relayed back to the server, which may in turn instruct the active EDR unit 14 to initiate a dialog with the subject using speech recognition software to determine what level of assistance may be required (steps 304 and 307).

If the active EDR unit determines that the user does require assistance, this information may be relayed to the central server 40 (step 308). The central server 40 may then initiate the appropriate communication about the detected emergency situation to the outside world (step 309). Depending on the type of assistance required the system could notify a neighbour, relative, medical staff (e.g. family doctor), emergency services (e.g. 911), or other appropriate personnel, via the external interface unit 52. Furthermore, this communication may occur via a variety of possible communications protocols, such as landline phone, cell phone, email, text message (SMS), or some other communication system.

As an optional configuration, at step 303, information about the current monitored behaviour of the user may be used to update a learned model of the user's daily "normal" behaviour and routines. This model may contain information about time of day and duration spent in certain locations of a house, etc. In this example, the ERR unit or central server may employ artificial intelligence algorithms (e.g. Markov Decision Process methods) to enable the system to gradually learn the expected daily behaviours of a given subject. This may allow the overall system to detect emergency situations more robustly by further characterizing "normal" versus "abnormal" behaviour for a given subject, which is done at steps 305 and 306. For example, if the subject is spending significantly more time in bed and less time in the living room than he/she normally does on a given day, this may be an indication of declining health (e.g. physical health issue such as flu, or a mental health issue such as depression). Since such a situation may not indicate an immediate emergency, the central server 40 may still tell the active EDR unit 14 to initiate a dialog with the user (step 307) that is adaptable and appropriate for the particular situation to determine if any assistance is required. For example, the system could ask the user if everything is ok because it appears they have been in the bedroom all afternoon. The active EDR unit 14 could perform these tasks by employing adaptable speech dialog technologies such as Text-To-Speech (TTS) software in conjunction with automatic speech recognition (ASR) software.

As a further optional configuration, in the case where multiple EDR units 14 are used, some or all of the EDR units may have a scaled-down local processor or may even have no processor at all. In this case, such EDR units may not perform full video processing or speech/audio processing, but may send video and audio data over the communications network 45 in real-time to either be processed by central server 40 or by a nearby EDR unit that does contain a fully functional local processor 20. This type of network configuration may be advantageous in some scenarios due to the centralization of video and audio processing for the system 10, which may make the system more affordable by reducing hardware and software costs of the EDR units. Furthermore, EDR units without a fully functional local processor 20 may be constructed using a smaller housing 14a, which may make them easier to install throughout a home as well as more aesthetically pleasing to the user.

In yet another optional configuration, there may be instances when the occupant will be located on or across the edge of the field of view of an EDR unit. When possible and necessary, images from overlapping EDR units' field of views may be delivered to the central computer and be stitched together to provide complete image of the subject, for later analysis. In cases such as this, the control module 22 may not assign a value to the emergency factor according to the data received from either the video processing module or the speech dialog module, or both, as the case may be, but rather transmit the raw video data image or images to the central controller, which may then assemble an image or images from the control unit of a neighbouring EDR unit in order to assemble a full image of the combined field of view, so that the emergency factor may then be valued.

For exemplary purposes, the device 10 may be operated as follows. In the event of an adverse event, such as a fall, the units that are closest to the occupant may "view" and "listen" for input (e.g., commands and responses) from the occupant. The input received by each EDR unit (hereinafter referred to below as a ceiling mounted unit (CMU)) may then assigned a confidence factor (CF), which may indicate what the likelihood is that the input from the occupant perceived by the system matches an actual verbal input from the occupant. The CF may be influenced by aspects such as (but not limited to) CMU proximity to the occupant, ambient noise levels, and word recognition error rate (WRER, which is estimated by the speech recognition software), and may be calculated using a function similar to the one described in Equation 1:

$$CF=1/[\beta_1(\text{proximity})+\beta_2(\text{ambient noise level})+\beta_3(1-\text{WRER})] \quad (1)$$

where $\beta_1$, $\beta_2$, and $\beta_3$ are constants determined through a combination of within-lab experimentation and calibration once the system is installed in an environment. Post-installation calibration may be necessary, as the layout of the environment may influence the acoustics, to determine each CMUs' "hearing" range.

The CMU that rates the occupant's response with the highest CF may then dictate action by the central control unit. This unit may not necessarily be the CMU closest to the occupant (as demonstrated in the scenarios below).

A situation may occur where an occupant has an adverse event in a visual monitoring area covered by two or more CMUs. As the images from the units may be stitched together, an entire image of the occupant may be available to the system.

The system may also be designed so that the occupant may activate the system using a keyword (e.g., "Help!"), to enable the occupant to procure assistance regardless of whether s/he is visible by the system. In this instance, the system may determine the occupant's most likely responses using verbal input only. The unit that has the highest CF may be the one relaying responses, although since the proximity will be unknown, Equation 1 may be altered to reflect this (such as a '0' value for proximity).

Example Scenarios

The following scenarios are presented for illustrative purposes only. Consider that a subject experiences an adverse event near a source of sound interference, such as a television, as depicted at 13 in FIG. 1. For the sake of simplicity, assume the distance to CMU #1 is 3 meters ($d_1$=3) and to CMU #2 is 8 meters ($d_2$=8) and (notionally for the purposes of this example), that proximity has the least impact on a CMU's ability to "hear" verbal input ($\beta_1$=0.2), ambient noise has the most impact ($\beta_2$=0.6), and WRC is somewhere in between ($\beta_3$=0.3). Assume that the constants $\beta_2$ and $\beta_3$ are the same for both units. Note that as distance is in meters, ambient noise is an exponential measure (dB), and the WRER is expressed as a percentage, the constants $\beta_1$, $\beta_2$, and $\beta_3$ for a particular application may be established through empirical testing. The actual values for $\beta_1$, $\beta_2$, and $\beta_3$ will depend on the specific configuration of the device 10, the physical characteristics of the location being monitored, as well as the general health of the subject. For instance, for an application in which a subject is only able to whisper, the constant $\beta_2$ may be set to a higher value, when compared with the same location with a subject who is able to speak at a normal speaking volume.

Scenario 1: Television Off

If the television is off when the same adverse event occurs, there may be no dominant competing noise to interfere with communication. Assuming the room is quiet (25 dB) and the WRER is 5%, or 0.05, the CF for the two CMUs may be calculated as:

$$CF_1=1/[0.2(3)+0.6(25)+0.3(1-0.05)]\approx 0.060$$

$$CF_2=1/[0.2(8)+0.6(25)+0.3(1-0.05)]\approx 0.057$$

As the CF for CMU #1 is higher than the one for CMU #2 (i.e., $CF_1 > CF_2$), the input received by CMU #1 will be considered to be more reliable and therefore used by the central control unit to make decisions.

Scenario 2: Television on

Assume that the television is on at a volume of 70 dB when the adverse event occurs, creating a source of interference. As CMU #2 is further from the occupant than CMU #1, it is also further from the competing noise source and thus has less competing ambient noise, for example, 50 dB and 65 dB respectively. Moreover, while the television and the occupant are approximately equidistant from CMU #1, the occupant is closer to CMU #2 than the television is. The CF for the two CMUs might be:

$$CF_1=1/[0.2(3)+0.6(65)+0.3(1-0.05)]\approx 0.025$$

$$CF_2=1/[0.2(8)+0.6(50)+0.3(1-0.05)]\approx 0.031$$

In this case, the CF for CMU #2 is higher than the CF for CMU #1 (i.e., $CF_1 < CF_2$). Thus the verbal input received by CMU #2 may then be used by the central control unit to determine the appropriate action(s) to take.

Thus, an exemplary embodiment operates through one or more CMU's and a central control unit, where the CMU's are mounted to the ceiling, resulting in improved monitoring coverage while ensuring that the EDR units are unobtrusive and discrete. Each CMU includes a vision sensor, in this case as a non-recording video camera. The CMU also includes a microphone, one or more speakers, a processor, and a smoke alarm. Multiple CMR's may thus be used and networked together to ensure that designated areas of a monitored facility, such as a subject's home, may be monitored. One central controller may thus be installed in each home and be responsible for coordinating the CMU's and relaying communications to the outside world.

In one example, the system 10 may use computer vision techniques to track a subject as the subject moves about the subject's home and detects if there is an acute emergency event, such as a fall or a fire. In this case, the vision sensor does not record, transmit, or store collected images. The system does not provide continuous data about the subject's status and activities to an external source, thus preserving the subject's privacy. When an acute event is detected, one or more CMU's sensing the event dispatch event data to the central controller which then selects either the closest CMU, or another CMU with improved sensing results for the event, to be an active CMU to employ speech recognition algorithms to have a dialogue with the subject in distress to determine if and what type of assistance is required. In this case, 911 and the monitoring provider's live switchboard may be made available as needed, as well as one or more respondents that were predefined by the subject (e.g. a neighbour, a family member, and/or a friend). By verbally answering a short series of simple "yes"/"no" questions, or other simple verbal phrases, the subject may select which respondent s/he would like to contact.

To further improve the subject's safety, if the system 10 does not hear a response from the user during an acute event, the system may connect to a live operator at the provider's switchboard to assess the situation and provide appropriate assistance. Through the selection of the type of aid s/he would like to receive, the subject may thus remain fully in control of the situation and his/her health, promoting feelings the dignity, autonomy, and independence without compromising safety.

Thus, the system 10 provides, in one example, an automated emergency detection and response system that uses computer vision to detect an emergency event, such as a fall, and speech recognition and artificial intelligence to then determine the level of assistance that is required by an individual. These devices may be networked together with a central server 40 to provide more comprehensive monitoring throughout an entire living environment, without the necessity of having an older adult wear an alert device or call button.

The following references, as well as each and every reference, patent and patent application disclosed hereinabove, are incorporated herein by reference in their entirety:

[1] E. D. Mynatt, I. Essa, and W. Rogers, "Increasing the Opportunities for Aging in Place," presented at ACM Conference on Universal Usability (CUU), 2000.

[2] A. Mihailidis and G. Fernie, "Context-aware assistive devices for older adults with dementia," Gerontechnology, vol. 2, pp. 173-189, 2002.

[3] MacLaren-Plansearch, "The study of emergency response systems for the elderly," Canada Mortgage and Housing Corporation, Ottawa, ON 1988.

[4] F. G. Miskelly, "Assistive technology in elderly care," Age and Ageing, pp. 455-458, 2001.

[5] H. Asada, P. A. Shaltis, A. Reisner, S. Rhee, and R. Hutchinson, "Wearable CV Sensors," IEEE Engineering in Medicine and Biology Magazine—A Special Issue on Wearable Sensors/Systems and Their Impact on Biomedical Engineering, vol. March, 2003.

[6] K. Doughty, R. Lewis, and A. McIntosh, "The design of a practical and reliable fall detector for community and institutional applications," Presented at the Telemed 99 Conference, London, UK, 1999.

[7] M. Morris and J. Lundell, "Ubiquitous computing for cognitive decline: Findings from Intel's Proactive Health Research," Intel Corporation, Seattle, Wash. 2003.

[8] T. Lee and A. Mihailidis, "An intelligent emergency response system," Journal of Telemedicine and Telecare, in-press.

[9] B. Maki, "Physical Consequences of Falls Part II: An Aging Population will Lead to Mounting Fall-Related Health-Care Costs," Geriatrics and Aging, vol. 3, pp. 23, 2000.

[10] M. Johnson, A. Cusick, and S. Chang, "Home-Screen: A short scale to measure fall risk in the home," Public Health Nursing, vol. 18, pp. 169-177, 2001.

[11] L. P. Sands, K. Yaffe, L. Lui, A. Stewart, C. Eng, and K. Covinsky, "The effects of acute illness on ADL decline over 1 year in frail older adults with and without cognitive impairment," Journal of Gerontology, vol. 57A, pp. M449-M454, 2002.

[12] C. Paris, M. Thomas, R. Gilson, and J. Kincaid, "Linguistic Cues and Memory for Synthetic NaturalSpeech, Human Factors", vol. 42, no. 3, pp. 421-431, 2000.

[13] "Subscriber Services Monitors Training Manual", Lifeline Systems Canada Inc., 2005.

[14] D. Gardner-Bonneau, Human Factors and Voice Interactive Systems, Kluwer Academic Publishers, Massachusetts, p. 44, 1999.

[15] "Designing Prompts", Microsoft Corporation, Web document, http://msdn.microsoft.com/library/default.asp?url=/library/enus/sasdk_usermanual/html/UM_reds_UsingPromptDatabases.asp, Retrieved Apr. 11, 2005.

[16] E. Levin, R. Pieraccini, W. Eckert, "A Stochastic Model of Human-Machine Interaction for Learning Dialog Strategies", IEEE Transactions on Speech and Audio Processing, vol. 8, no. 1, January 2000.

[17] N. Roy, J. Pineau, S. Thrun, "Spoken Dialogue Management Using Probabilistic Reasoning", Proceedings of the 38th Annual Meeting of the Association for Computational Linguistics, 2000

While the present invention has been described for what are presently considered the preferred embodiments, the invention is not so limited. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

The invention claimed is:

1. A system for detecting and responding to emergency events occurring in a predetermined local area, comprising a plurality of local emergency detection and response units to be positioned in the local area, each local emergency detection and response unit including one or more local sensing agents and a local detection manager, the local detection manager including a local processor, each local sensing agent being operable to detect a change in a given emergency factor in the local area and to convey data representative of the change in the emergency factor, the detection manager being operable to receive the data and to assign a value to the emergency factor according to the data, and a local interface agent for issuing, on a data path, one or more event status signals including the assigned value for the emergency factor, a central location controller unit including a central processor and a central interface agent in communication with the local interface agent on the data path to receive the event status messages therefrom, each local emergency detection and response unit including a local emergency event response agent for responding to at least one person in or near the local area, the central location controller unit and/or the local emergency detection and response unit being operable for classifying the assigned value of the emergency function to form an assigned value classification and initiating the local emergency event response agent to implement a response protocol according to the assigned value classification, the response protocol including dispatching a message to the person and recording a response therefrom, the central processor including a ranking agent for ranking status signals being received from more than one local emergency detection and response unit in the same local area.

2. A system as defined in claim 1, the ranking agent being operable to rank each of the emergency detection and response units according to one or more ranking criteria, the central processor being operable to select one of the emergency detection and response units according to the ranking as an active local emergency detection and response unit to initiate the emergency event response protocol.

3. A system as defined in claim 2, the central processor being operable to receive status signals over regular, or periodic time intervals and to change the selection of the active emergency detection and response unit according to changes in the status signals.

4. A system as defined in claim 2, the at least one emergency factor being selected from a plurality of video variables and/or thresholds, a plurality of audio variables and/or thresholds, and a plurality of environmental variables and/or thresholds.

5. A system as defined in claim 4, the environmental variables and/or thresholds, including smoke concentration, carbon monoxide concentration, oxygen concentration, and/or environmental pollutant concentration.

6. A system as defined in claim 2, the ranking agent being operable to access and compare a plurality of emergency factors received from the plurality of reporting local emergency detection and response units.

7. A system as defined in claim 6, the emergency factor including a video image, the variable including size of object being tracked.

8. A system as defined in claim 6, the emergency factor including an audio signal, the variable including amplitude and type of the audio signal.

9. A system as defined in claim 6, the ranking agent assigning, as active, the active local emergency detection and response unit possessing the highest ranking for a given emergency factor.

10. A system as defined in claim 1, the local processor or the central processor including a voice processing agent for issuing voice signals to the person or receiving and interpreting voice signals from the person.

11. A system as defined in claim 1, one of the sensing functions including a fixed or steerable digital camera.

12. A system as defined in claim 1, one of the sensing functions including a microphone.

13. A system as defined in claim 1, one of the sensing functions including an environmental detector.

14. A system for detecting and responding to emergency events occurring in a predetermined local area, comprising a plurality of local emergency detection and response units positioned in the local area, each local emergency detection and response unit including one or more local sensing agents and a local detection manager, the local detection manager including a local processor, each local sensing agent being operable to detect emergency events by a change in a given emergency factor in the local area and to convey data representative of the change in the emergency factor, the detection manager being operable to receive the data and to assign a value to the emergency factor according to the data, and a local interface agent for issuing, on data path, one or more event status messages including the assigned value for the emergency factor, a central location controller unit including a central processor and a central interface agent in communication with the local interface agent on the data path to receive the event status messages therefrom, each local emergency detection and response unit including a local emergency event response agent for responding to at least one person in or near the predetermined area, the central location controller unit and/or the local emergency detection and response unit being operable for classifying the assigned value of the emergency function to form an assigned value classification and for initiating the local emergency event response agent to implement a response protocol according to the assigned value classification.

15. A system as defined in claim 14, the central processor being operable to receive regular or periodic messages from each emergency detection and response unit after detecting activity in the local area, the central processor recording the activity to track a subject between multiple emergency detection and response units as the subject moves through the local area.

16. A system for detecting and responding to emergency events occurring in a predetermined local area, comprising a plurality of local emergency detection and response units to be positioned in the local area, each local emergency detection and response unit including one or more local sensing agents and a local detection manager, the local detection manager including a local processor, each local sensing agent being operable to detect a change in a given emergency factor in the local area and to convey data representative of the change in the emergency factor, the detection manager being operable to receive the data and to assign a value to the emergency factor according to the data, and a local interface agent for issuing, on a data path, one or more event status signals including the assigned value for the emergency factor, each local emergency detection and response unit including a local emergency event response agent for responding to at least one person in or near the local area, the local emergency detection and response unit being operable for classifying the assigned value of the emergency function to form an assigned value classification and initiating the local emergency event response agent to implement a response protocol according to the assigned value classification, the response protocol including dispatching a message to the person and recording a response therefrom, one or more of the local detection and response units responsive to data received on the data path for ranking status signals received from more than one local emergency detection and response unit in the same local area, one or more of the local emergency detection and response units being operable to select one of the emergency detection and response units according to the ranking as an active local emergency detection and response unit to initiate the emergency event response protocol.

17. A system as defined in claim 16, wherein the local emergency detection and response units are each operable for exchanging the assigned values from one another to form an assigned value group.

18. A system as defined in claim 17, wherein one or more of the local emergency detection and response units are operable to select an active emergency detection and response unit according to a ranking of individual values in the value group.

19. A method for detecting and responding to emergency events occurring in a predetermined local area, comprising:
   i. providing a local emergency detection and response unit in the local area,
   ii. providing the local emergency detection and response unit with one or more local sensing agents and a local detection manager with a local processor,
   iii. configuring the local sensing agents to detect an emergency event by a change in a corresponding emergency factor in the local area, and to generate data representative of the change in the emergency factor, arranging the detection manager to assign a value to the emergency factor according to the first data,
   iv. providing a local interface agent for issuing, on a data path, one or more event status signals including the assigned value for the emergency factor,
   v. providing a local emergency event response agent for responding to at least one person in or near the local area, and
   vi. configuring the local interface agent to receive an initiation signal for initiating the local emergency event response agent to implement a response protocol according to an assigned value.

20. A method for detecting and responding to emergency events occurring in a predetermined local area, comprising:
   i. providing a plurality of local emergency detection and response sites in the local area;
   ii. providing each local emergency detection and response site with one or more local sensing agents;
   iii. configuring the sensing agents to sense a change in a predetermined emergency factor in the local area;
   iv. providing a detection manager at each site to receive, from each sensing local sensing agent, data representative of the change in the emergency factor,
   v. arranging the detection manager to assign a value to the emergency factor according to the data;
   vi. dispatching, over a data path, one or more event status messages including the assigned value for the emergency factor;
   vii. providing a central location controller to receive, in a first operative phase, the event status messages over the data path; and
   viii. configuring the central location controller, in a second operative phase, to:
      1. classify the assigned value of the emergency factor to form an assigned value classification;
      2. rank the status messages according to one or more ranking criteria,
      3. select one of the emergency detection and response sites according to the ranking as an active local emergency detection and response site to initiate an emergency event response protocol; and
      4. instruct the selected active local emergency detection and response site to initiate the emergency event response protocol.

21. A method as defined in claim 20, further comprising configuring the central location controller to:
   i. operate in the first operative phase receive the event status messages;
   ii. operate in the second operative phase concurrently with the first operative phase to:
      1. select a new active local emergency detection and response site according to changes in the assigned values of the emergency factors; and
      2. instruct the new active local emergency detection and response site to initiate the emergency event response protocol.

\* \* \* \* \*